United States Patent
Kim

(10) Patent No.: US 7,783,290 B2
(45) Date of Patent: Aug. 24, 2010

(54) MOBILE TERMINAL AND METHOD FOR ASSOCIATING PHOTOS WITH TELEPHONE NUMBERS IN A MOBILE TERMINAL

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 11/253,656

(22) Filed: Oct. 20, 2005

(65) Prior Publication Data

US 2006/0148455 A1 Jul. 6, 2006

(30) Foreign Application Priority Data

Dec. 30, 2004 (KR) .................. 10-2004-0116963

(51) Int. Cl.
*H04W 4/00* (2009.01)
*H04B 1/38* (2006.01)

(52) U.S. Cl. .................. 455/433; 455/564; 455/566

(58) Field of Classification Search ............. 455/412.1, 455/414.1, 414.4, 415, 433, 564–566, 567; 348/14.01, 14.02, 14.03
See application file for complete search history.

(56) References Cited

U.S. PATENT DOCUMENTS

| | | | |
|---|---|---|---|
| 6,766,018 B1 * | 7/2004 | Morita | ............. 379/355.09 |
| 7,130,394 B2 | 10/2006 | Koyama et al. | |
| 2001/0008412 A1 * | 7/2001 | Ando et al. | ............. 348/14.02 |
| 2004/0207722 A1 | 10/2004 | Koyama et al. | |
| 2004/0237048 A1 | 11/2004 | Tojo et al. | |

FOREIGN PATENT DOCUMENTS

| | | |
|---|---|---|
| CN | 1224295 A | 7/1999 |
| DE | 19959647 | 7/2000 |
| EP | 0930770 | 7/1999 |
| EP | 09307770 | 7/1999 |
| EP | 1033878 | 9/2000 |
| EP | 1469374 | 10/2004 |
| GB | 2346769 | 8/2000 |
| JP | 11-041339 | 2/1999 |
| JP | 2000-196729 A | 7/2000 |
| JP | 2000-253373 | 9/2000 |
| JP | 2001-136303 | 5/2001 |

(Continued)

OTHER PUBLICATIONS

English language Abstract of JP 2004-336711.

(Continued)

*Primary Examiner*—George Eng
*Assistant Examiner*—Brandon J Miller
(74) *Attorney, Agent, or Firm*—Birch, Stewart, Kolasch & Birch, LLP

(57) ABSTRACT

A mobile terminal is described, along with a method for associating photos with contact information in a mobile terminal by using a reference field, which facilitates convenient searching of photos and contact information stored in a mobile terminal. According to the method, a person's photos can be immediately viewed while the user is browsing a contact list. Additionally, when a user wishes to contact a person whose photo he is viewing, the user can immediately contact the person with the mobile terminal without having to search for the person's contact information.

16 Claims, 4 Drawing Sheets

FOREIGN PATENT DOCUMENTS

| | | |
|---|---|---|
| JP | 2004-088709 | 3/2004 |
| JP | 2004-336711 | 11/2004 |
| KR | 10-2005 0028930 | 3/2005 |
| WO | 2003/062975 | 7/2003 |
| WO | 2004/093432 | 10/2004 |

OTHER PUBLICATIONS

English language Abstract of JP 2000-253373.
English language Abstract of JP 2001-136303.
English language Abstract of JP 2004-088709.
English language Abstract of JP 11-041339.
English language Abstract of KR 10-2005-0028930.

* cited by examiner

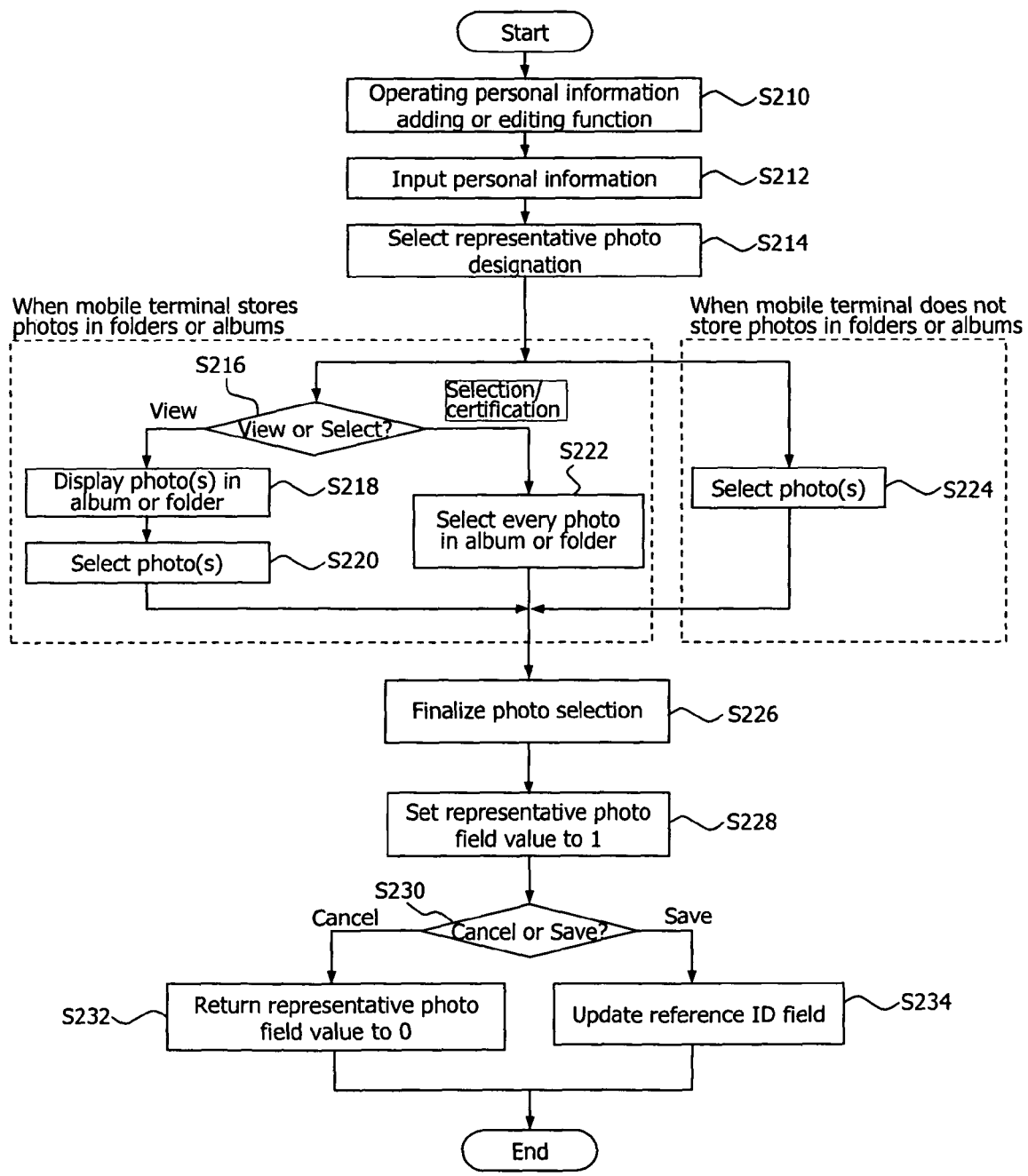

MOBILE TERMINAL AND METHOD FOR ASSOCIATING PHOTOS WITH TELEPHONE NUMBERS IN A MOBILE TERMINAL

This application claims the benefit of the Korean Application No. 10-2004-116963 filed on Dec. 30, 2004, which is hereby incorporated by reference in its entirety.

BACKGROUND OF THE INVENTION

1. Field of the Invention

The present invention relates to a mobile terminal, and to a method for associating photos with telephone numbers in a mobile terminal by using a reference field, which facilitates convenient searching of photos and contact information stored in a mobile terminal.

2. Description of the Conventional Art

Currently, many mobile terminals on the market are provided with, in addition to basic communication functions, advanced features which allow the mobile terminals to operate as portable entertainment systems. For example, many mobile terminals are now capable of storing and displaying photos, playing video and music, providing Internet browsing features, and functioning as a mobile game terminal.

Recently, many mobile terminals have been provided with high quality cameras capable of taking photos made up of more than a million pixels and high capacity internal memory which can be upgraded by interfacing the mobile terminals with external memory. Accordingly, it is unnecessary for a user of this type of mobile terminal to purchase an additional camera.

However, in the prior art mobile terminals having such a camera feature it is difficult to search for photos stored in memory. Typically, to search for a specific photo stored in a terminal, a user has to search, by title, a stored list of photos and/or folders. If the user cannot remember the title of the specific photo he is seeking, he must select and view each of the photos, one by one, until he finds the photo he is looking for. This is a major inconvenience to the user.

Further, a user may encounter a situation where he wants to telephone a person whose photo he is currently viewing. To do this, he must exit the photo viewing application he is using, and then enter the telephone number of the person he wishes to call. If he cannot remember the telephone number, he must first open a phone book application to find the person's number. This is another inconvenience of the prior art mobile terminals.

SUMMARY OF THE INVENTION

Therefore, an object of the present invention is to provide a method which facilitates convenient searching of photos and contact information stored in a mobile terminal.

To achieve these and other advantages, and in accordance with the purpose of the present invention, as embodied and broadly described herein, there is provided a method for accessing photos in a mobile terminal including: selecting a person from a contact list stored in the mobile terminal; selecting a photo viewing option; and displaying at least one photo corresponding to the selected person from photos stored in a memory.

At least one of the photos stored in the memory may be associated with a reference ID value, and the mobile terminal includes a contact list database that includes personal information for at least one person associated with a contact list database ID value. The reference ID value identifies a contact list database ID value associated with a person when the photo associated with the reference ID value is set to represent the person. The reference ID value is set by designating a photo as a representative photo for a person. Designating a representative photo for a person includes inputting personal information by using a function for adding or editing personal information, selecting a photo as a representative photo, and setting the reference ID value associated with the representative photo to the contact list database ID value associated with the person.

The photo(s) corresponding to the selected person consist of photo(s) associated with a reference ID value corresponding to a contact list database ID value associated with the selected person. The method also includes indicating that a photo corresponding to the person does not exist when a photo corresponding to the person does not exist. Indicating that a photo corresponding to the selected person does not exist includes outputting at least one of a text message and a sound. The contact list may include one of a phone book and an address book.

Another aspect of the invention relates to a method for contacting a person using a mobile terminal, which includes displaying a photo, selecting a contact operation while the photo is displayed, determining whether contact information corresponds to the displayed photo, and contacting the person using contact information corresponding to the displayed photo if it is determined that corresponding contact information exists.

Determining whether contact information corresponds to the displayed photo includes determining whether the displayed photo is associated with a reference ID value. Determining whether the displayed photo is associated with a reference ID value includes determining the value of a representative photo field associated with the displayed photo. For example, the reference ID value does not exist when the representative photo field value is "0", and the reference ID value exists when the representative photo field value is "1".

A reference ID value is associated with the displayed photo by designating the displaying photo as a representative photo for a person. Designating the displayed photo as a representative photo includes inputting personal information by using a function for adding or editing personal information, selecting a photo as a representative photo, updating a representative photo field associated with the selected representative photo, and setting the reference ID value associated with the representative photo to a contact list database ID value associated with the contact information.

The person corresponding to the displayed photo is associated with a contact list database ID value that corresponds to a reference ID value associated with the displayed photo. Selecting a contact operation may include pressing a key corresponding to a calling or messaging function, or selecting a contact operation from a menu. Selecting a contact operation may also include selecting to call a phone number, and contacting the person may include automatically calling a phone number associated with the person. Selecting a contact operation may also include selecting to send a text message or an email message, and contacting the person may include automatically creating a message addressed to a text message address, or an email address of the person, and completing and sending the text message or email message.

Another aspect of the present invention relates to a mobile terminal. The mobile terminal includes a contact list database that stores personal information associated with at least one person, and a photo database that includes information that associates at least one photo stored in a memory of the mobile terminal with a person whose personal information is stored in the contact list database.

The photo database stores at least one data entry associated with a photo, which includes a reference ID field configured to designate a data entry stored in the contact list database. The contact list database stores at least one data entry associated with a person, which includes a contact list database ID field. Each reference ID field is configured to store the value of a contact list database ID field. Each data entry stored in the contact list database includes personal information, which may include at least one of a phone number and an email address.

Each data entry stored in the photo database includes a representative photo value that indicates whether the photo associated with the data entry is associated with a person. The mobile terminal is configured to display a list of photos corresponding to a person selected from the contact list database by accessing the contact list database and the photo database. The mobile terminal is also configured to contact a person associated with a photo displayed on the mobile terminal by accessing the contact list database and the photo database.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flowchart illustrating a method for designating a representative photo in a mobile terminal according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
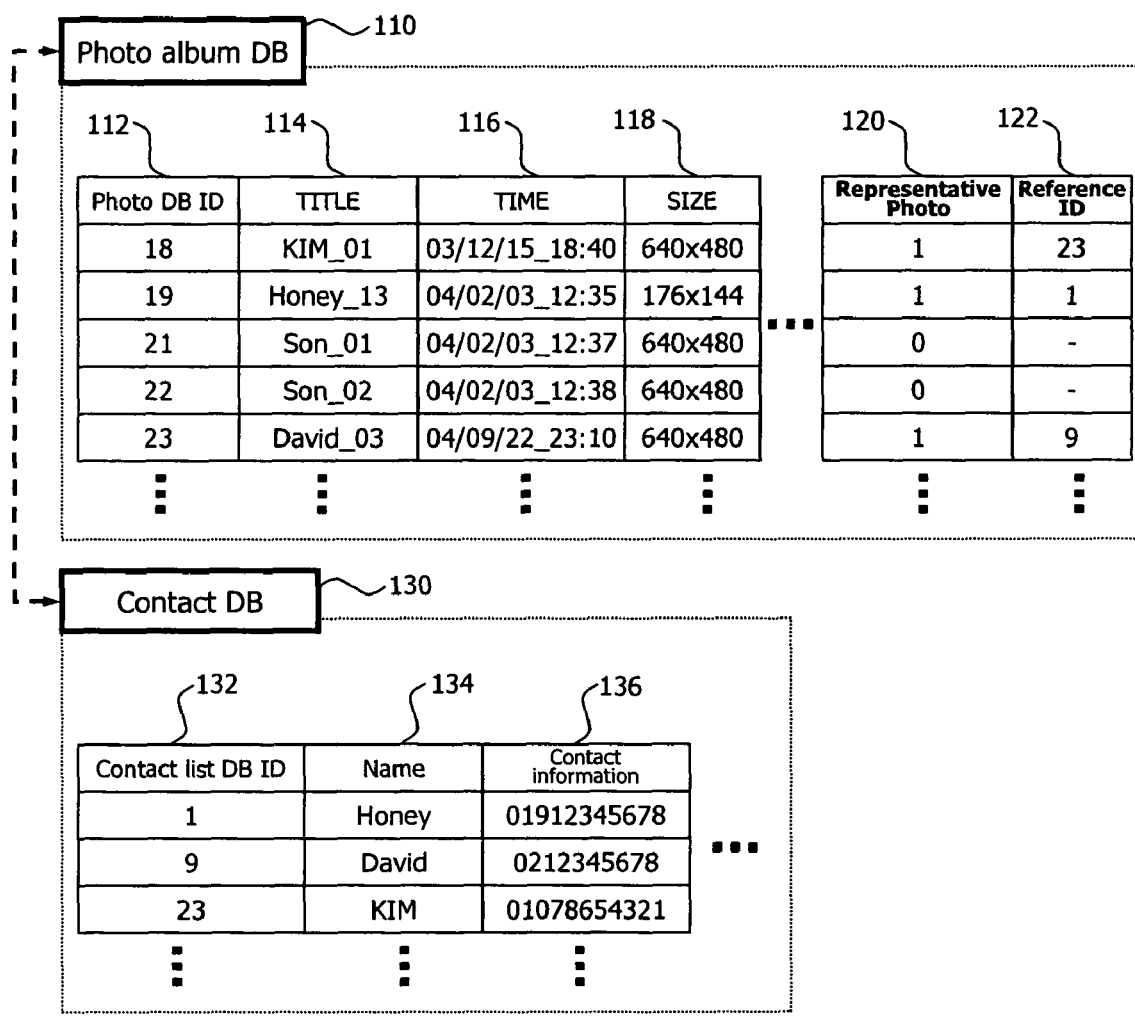
FIG. 1 is a diagram illustrating one embodiment of reference fields used in a photo album and a contact list of a mobile terminal in accordance with the present invention.

FIG. 1 is a diagram illustrating one embodiment of reference fields used in a photo album and a contact list of a mobile terminal in accordance with a method of the present invention.

As illustrated in FIG. 1, a photo album database (DB) 110 stored in a mobile terminal according to the present invention includes any suitable data fields, such as a photo database identifier (ID) field 112, a title field 114, a time field 116, a size field 118, etc. In addition to such data fields, the photo album database (DB) 110 also includes a representative photo field 120 and a reference identifier (ID) field 122.

The photo database identifier field 112 is used to uniquely identify each photo stored in memory with an identifier such as a number, and the title field 114 is used to store a title of a stored photo.

The time field 116 is used to indicate the date and time that a photo was stored in memory, and the size field 118 is used to indicate the size of a stored photo, such as by number of pixels.

The representative photo field 120 is used to designate whether a photo is a "representative photo". A representative photo is a photo which is associated with a person stored in a contact list of the mobile terminal. If a representative photo field 120 value is a "1", for example, the representative photo field 120 indicates that a photo is a representative photo, whereas if the representative photo field 120 value is a "0", for example, the representative photo field 120 indicates that the photo is not a representative photo. That is, a "1" indicates that a photo is associated with a person stored in a contact list of the mobile terminal, and a "0" indicates that the photo is not associated with a person stored in the contact list. Of course, the values "0" and "1" are merely exemplary, and any suitable indicators could be used in the representative photo field.

The reference identifier field 122 is used to identify an entry in the contact list of the mobile terminal, by identifying a specific contact list database identifier value. The reference identifier field 122 is populated with a value only when a photo is a representative photo, that is, when the corresponding representative photo field 120 value is a "1", for example.

A contact list database (DB) 130 includes any suitable fields, such as a contact list database (DB) identifier (ID) field 132 which is used to uniquely identify each person whose personal information is stored in the mobile terminal, a name field 134 which is used to store a name of the person, and at least one contact information field 136 which is used to store contact information of a person. Any suitable type of contact information may be stored in the contact information field 136, such as a phone number or email address. Although only one contact information field is illustrated in FIG. 1, multiple contact information fields may be provided for each entry, so that multiple contact information may be stored for each person (e.g., home phone number, work phone number, email address, etc.).

FIG. 2 is flowchart illustrating a method for designating a photo as a representative photo in a mobile terminal according to the present invention.

Referring to FIG. 2, the method begins by a user selecting a function for adding or editing personal information for a person in the mobile terminal (S210).

When a screen for adding or editing personal information is displayed on a display of the mobile terminal, the user adds or edits a person's personal information (S212). The personal information may include any suitable types of information, such as a name, a group, one or more phone numbers, e-mail/homepage addresses, a character, a birthday, a ringtone, a memo, etc.

When the adding or editing of the personal information is completed, the user manipulates the mobile terminal to select a function for designating a representative photo to be associated with the person (such as by pressing a particular key, or selecting an entry from a menu) (S214).

In some mobile terminals, photos may be stored in albums or folders. In this case, a user may select a view key to view the entire contents of an album or folder, or may select a select key to select the entire contents of the album or folder. (S216). If the user selects a view key, all of the photos in an album or folder are displayed (S218).

While viewing all of the photos in the album or folder, the user may then select at least one of the viewed photos to be a representative photo (S220). However, if the user selected the select key, rather than the view key, every photo in the album or a folder is selected to be a representative photo (S222).

If the mobile terminal does not store photos in albums or folders, the mobile terminal displays a list of all of the photos stored in the mobile terminal. The user then selects at least one of the photos as a representative photo (S224).

This is followed by the user finalizing his selection of representative photo(s), for example, by the user deselecting photos he previously selected (S226). Finalizing the selection may include, for example, but not limited to, determining, by the mobile terminal, whether the user has selected more than one photo as a representative photo, and designating, by the user, only one of the selected photos as a representative photo.

After the user has selected representative photo(s), the mobile terminal updates a representative photo field value 120 corresponding to each selected photo to indicate that the selected photo is a representative photo (such as by storing a "1" in the representative photo field 120) (S228). The user will then indicate (by pressing a key, for example) whether he wishes to cancel his selection or save it (S230).

If the user cancels the selection, the representative photo field 120 value(s) are returned to a "0" (S232). However, if the user indicates that he wishes to save his selection, the reference ID field(s) 122 corresponding to the selected photo(s) are updated to identify the contact list database ID value 132 corresponding to the selected person (S234).

By the above processes, the user can associate a representative photo with a person stored in the mobile terminal's contact list. Thus, when the user selects the person's name from the mobile terminal's contact list, the user may then select an option to instantly view the representative photo(s) corresponding to that person, thereby eliminating the need to perform a separate photo search. Further, when the user selects a contact operation while viewing a photo, the mobile terminal may automatically contact the person associated with the photo.

Figure 3A:
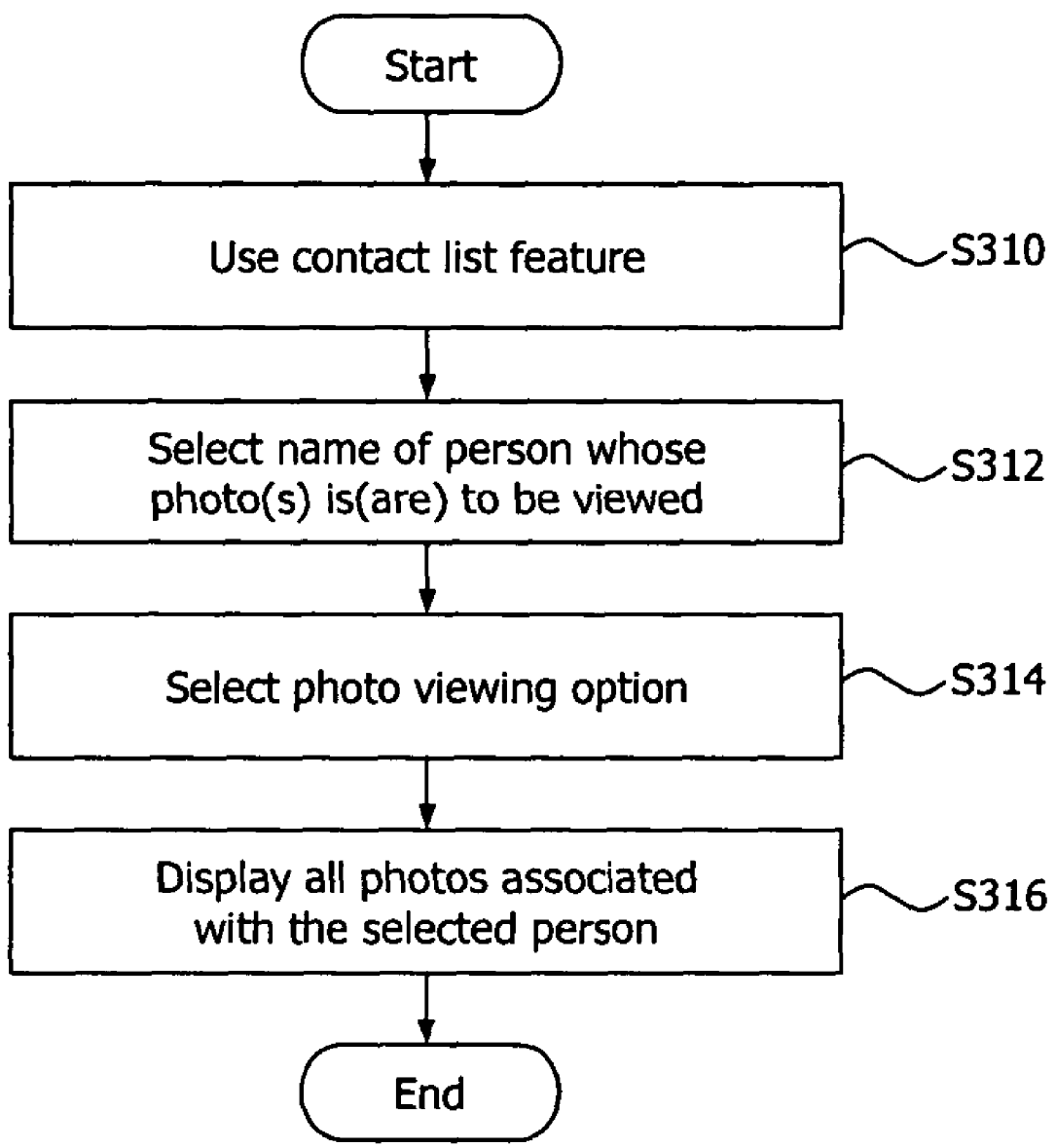
FIG. 3A is a flowchart illustrating a method for searching for photos from a contact list, according to the present invention.
Figure 3B:
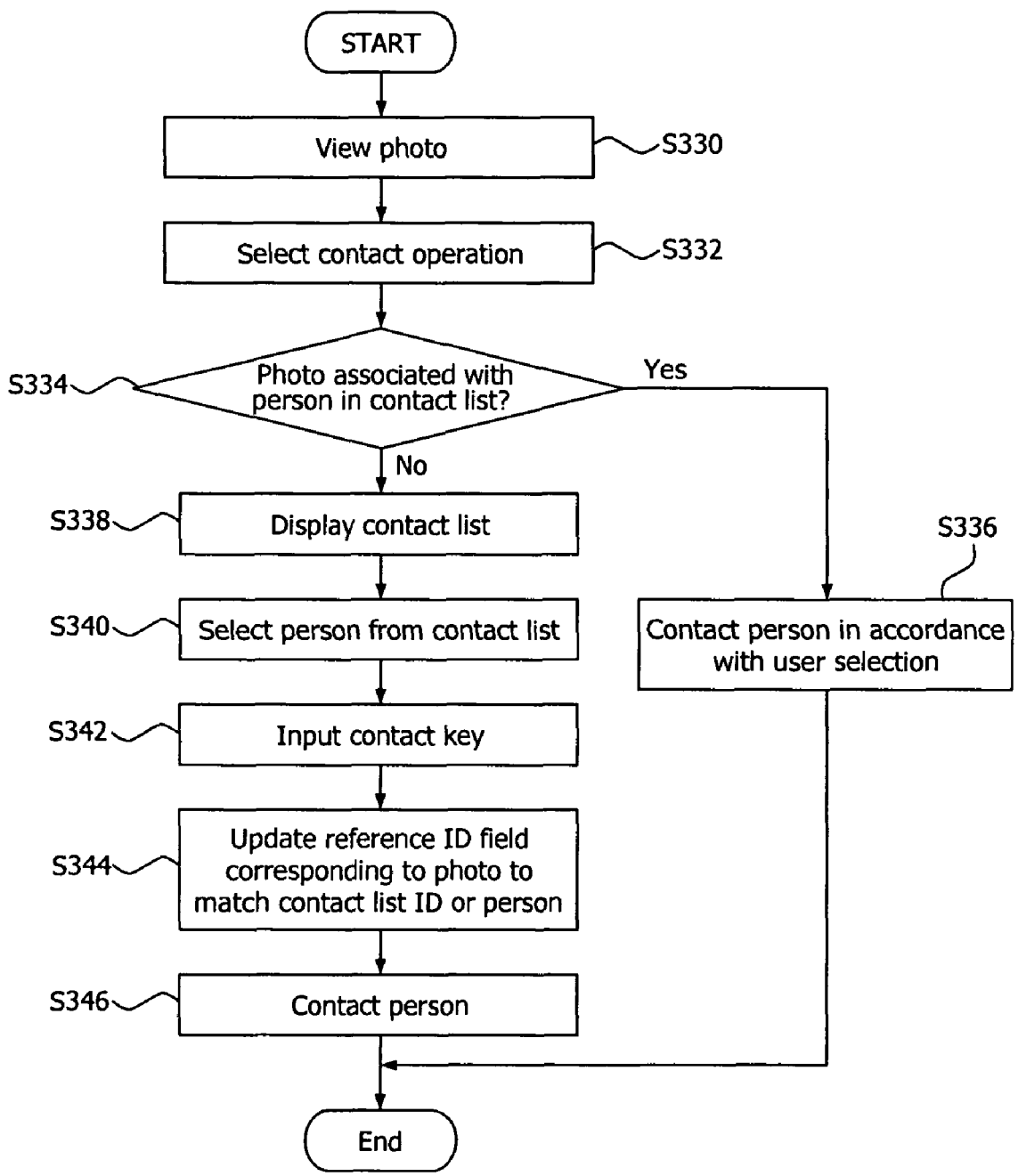
FIG. 3B is a flowchart illustrating a method for contacting a person associated with a photo while viewing the photo, according to the present invention.

FIGS. 3A and 3B are flowcharts illustrating methods for using the reference ID field value of the present invention. FIG. 3A illustrates a method for searching for photos from a contact list, and FIG. 3B illustrates a method for conveniently contacting a person associated with a photo being viewed by a user.

Referring to FIG. 3A, while a user is using a contact list feature of a mobile terminal, such as an address book or phone book feature (S310), if he wishes to view photos associated with a person whose personal information is stored in the mobile terminal, he selects that person's name from the contact list (S312).

When a person is selected from the contact list, the mobile terminal will display the person's personal information on the mobile terminal's display. If the user selects a photo viewing function, from an option menu for example, (S314), the mobile terminal retrieves and displays a list of photos corresponding to the selected person (S316). This is performed by the mobile terminal searching the photo album database for all photos whose reference ID value 122 corresponds to the contact list ID value 132 of the selected person. The user may then conveniently view all photos corresponding to the selected person without having to perform a separate, cumbersome photo search.

However, if no photos are associated with the selected person (i.e., no photos have a reference ID value 122 corresponding to the contact list database ID value 132 of the selected person) no photo will be displayed, and the mobile terminal informs the user that there is no corresponding photo, for example, by displaying a text message and/or or outputting a sound.

Referring to FIG. 3B, while the user is viewing a photo stored in the mobile terminal (S330), if he desires to contact the person associated with the photo, the user may select a contact operation, such as by pressing a key corresponding to a calling or messaging function, or by selecting a contact operation from a menu (S332).

If a contact operation is selected, the mobile terminal determines whether the photo is associated with a person whose personal information is stored in the contact list of the mobile terminal (i.e., determines whether the photo is a representative photo based on the representative photo field 120) (S334).

If the photo is associated with a person whose personal information is stored in the contact list, a contact function may be performed automatically, or a menu containing various contact options may be presented to a user. Such contact function or contact option may include, but are not limited to, call a home phone number, call a work phone number, send a text message, send an email message, etc. The mobile terminal will then contact the person in accordance with the user's selection (S336). For example, if the user selects an option to call the home or work phone number of the person, the mobile terminal will automatically dial the person's home or work phone number, as stored in a contact information field 136. If the user selects an option to send an email or text message to the person, the mobile terminal will open a messaging application, create a message automatically addressed to the person's email or text address, as stored in a contact information field 136, and after the user enters the body of the message, send the message to the person.

However, if the photo is not a representative photo (i.e., the representative photo field value 120 is "0"), the mobile terminal opens a contact list feature and displays a contact list (S338). The user may then select a person from the contact list (S340).

If contact information for the desired person, such as a phone number or email address, does not exist in the contact list, the user can directly input the contact information. If the user inputs a key to contact the person, such as a call or send message key (S342), the mobile terminal contacts the person accordingly (S346). At the same time, the mobile terminal may associate the photo with the contact information provided by the user, by updating the representative photo field 120 and the reference ID field 122 corresponding to the photo to match the contact list ID value 132 of the person (S344).

As aforementioned, according to the present invention, all of a person's photos can be conveniently retrieved and viewed by looking up the person's name in the contact list of the mobile terminal.

Also, according to the present invention, if a user wants to contact a person while viewing his photos, the person can be immediately and conveniently contacted, due to the association formed by the reference identifier field of the photo album database.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling a mobile terminal, the method comprising:

storing, in a memory of the mobile terminal, contact information for contacting at least one other terminal in a contact information database and photo information including a plurality of photos of people in a photo information database that is separate from the contact information database and that does not include the contact information;

displaying a photo selected among the plurality of photos during a photo viewing mode and before a contacting mode is started to contact said at least one other terminal of a person associated with the displayed photo;

receiving a command while the photo is displayed indicating a request to contact the person associated with the displayed photo;

checking the photo information database to determine whether the displayed photo is associated with the contact information for contacting the person associated with the displayed photo;

using an identifier value from the photo information database if the checking step determines the displayed photo is associated with the contact information, said identifier value indicating a location of the contact information in the contact information database for the person associated with the displayed photo; and contacting the person associated with the displayed photo using the contact information.

2. The method according to claim 1, wherein the identifier value is associated with the displayed photo by designating the displayed photo as a representative photo for the person.

3. The method according to claim 2, wherein designating the displayed photo as the representative photo comprises:

inputting personal information by using a function for adding or editing personal information;

selecting the displayed photo as the representative photo;

updating a representative photo field associated with the selected representative photo; and setting the identifier value associated with the representative photo to a contact list database ID value associated with the personal information.

4. The method according to claim 1, wherein checking the file in the photo database comprises determining a value of a representative photo field associated with the displayed photo.

5. The method according to claim 4, wherein the identifier value does not exist when the representative photo field value is 0.

6. The method according to claim 4, wherein the identifier value exists when the representative photo field value is 1.

7. The method according to claim 1, wherein the command comprises one of pressing a key corresponding to a calling or messaging function and selecting a contact operation from a menu.

8. The method according to claim 1, wherein the command comprises selecting to call a phone number, and contacting the person comprises automatically calling a phone number associated with the person.

9. The method according to claim 1, wherein the command comprises selecting to send one of a text message and an email message, and contacting the person comprises automatically creating a message addressed to one of a text message address and an email address of the person, and completing and sending the text message or email message.

10. A mobile terminal, comprising:

a memory configured to store contact information for contacting at least one other terminal in a contact information database and photo information including a plurality of photos of people in a photo information database that is separate from the contact information database and that does not include the contact information;

a display configured to display a photo selected among the plurality of photos during a photo viewing mode and before a contacting mode is started to contact a user associated with the displayed photo;

an input unit configured to receive a command while the photo is displayed indicating a request to contact a person associated with the displayed photo; and a controller configured to check the photo information database to determine whether the displayed photo is associated with the contact information for contacting the person associated with the displayed photo, to use an identifier value from the photo information database if the displayed photo is determined to be associated with the contact information, and to control a communication unit to contact the person associated with the displayed photo using the contact information, said identifier value indicating a location of the contact information in the contact information database for the person associated with the displayed photo.

11. The mobile terminal according to claim 10, wherein the input unit is further configured to allow a user to associate any of the stored plurality of the photos with stored contact information.

12. The mobile terminal according to claim 10, wherein the photo information database includes a field indicating whether or not the displayed photo is associated with the stored contact information, and the identifier when the field includes a value indicating the displayed photo is associated with the contact information.

13. The mobile terminal according to claim 12, wherein the identifier value does not exist when the field has a value of 0, and does exist when the field has a value of 1.

14. The mobile terminal according to claim 10, wherein the command corresponds to a user manipulating a key for a calling function or a messaging function.

15. The mobile terminal according to claim 14, wherein the controller is further configured to automatically call a phone number corresponding to the person associated with the displayed photo when the user manipulates the key for the calling function.

16. The mobile terminal according to claim 14, wherein the controller is further configured to open a messaging application allowing a user to create a message to be sent to the person associated with the displayed photo when the user manipulates the key for the messaging function.

* * * * *